United States Patent
Tan et al.

(10) Patent No.: US 11,199,655 B2
(45) Date of Patent: Dec. 14, 2021

(54) LIGHT SOURCE MODULE AND ELECTRONIC DEVICE

(71) Applicant: BOE TECHNOLOGY GROUP CO., LTD., Beijing (CN)

(72) Inventors: Jifeng Tan, Beijing (CN); Wei Wang, Beijing (CN); Xiandong Meng, Beijing (CN); Xianqin Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/757,843

(22) PCT Filed: Sep. 28, 2018

(86) PCT No.: PCT/CN2018/108198
§ 371 (c)(1),
(2) Date: Apr. 21, 2020

(87) PCT Pub. No.: WO2019/140949
PCT Pub. Date: Jul. 25, 2019

(65) Prior Publication Data
US 2021/0191023 A1 Jun. 24, 2021

(30) Foreign Application Priority Data
Jan. 18, 2018 (CN) .......................... 201810048974.5

(51) Int. Cl.
*F21V 8/00* (2006.01)
*G02B 6/10* (2006.01)

(52) U.S. Cl.
CPC .......... *G02B 6/0023* (2013.01); *G02B 6/0068* (2013.01); *G02B 6/0073* (2013.01); *G02B 6/10* (2013.01)

(58) Field of Classification Search
CPC .. G02B 6/0023; G02B 6/0068; G02B 6/0073; G02B 6/10
See application file for complete search history.

(56) References Cited

U.S. PATENT DOCUMENTS

| 4,737,896 A | 4/1988 | Mochizuki et al. |
| 2008/0025667 A1 | 1/2008 | Amitai |

(Continued)

FOREIGN PATENT DOCUMENTS

| CN | 1683966 A | 10/2005 |
| CN | 105223641 A | 1/2016 |

(Continued)

OTHER PUBLICATIONS

Office action issued for EP Application No. 18900933.5 and dated Aug. 2, 2021, 7 pages.

*Primary Examiner* — Anabel Ton
(74) *Attorney, Agent, or Firm* — Dave Law Group LLC; Raj S. Dave

(57) ABSTRACT

A light source module and an electronic device. The light source module includes an optical waveguide structure, a first light source, and a pre-collimating optical element. The optical waveguide structure includes a light introduction part and a main body part, the light introduction part includes a light incident surface, and the main body part includes a light emitting surface. The first light source is configured to provide first light; and the pre-collimating optical element is configured to collimate at least a portion of the first light to be first collimated light. The light introduction part is configured to introduce at least a portion of the first collimated light, which is incident from the light incident surface, into the main body.

20 Claims, 8 Drawing Sheets

(56) References Cited

U.S. PATENT DOCUMENTS

2011/0292318 A1   12/2011  Nakamoti et al.
2017/0090096 A1*  3/2017  Fattal .................. G02B 27/425

FOREIGN PATENT DOCUMENTS

| CN | 106405937 A | 2/2017 |
| CN | 107526215 A | 12/2017 |
| EP | 3136159 A1 | 3/2017 |
| TW | 200839378 A | 10/2008 |

* cited by examiner

LIGHT SOURCE MODULE AND ELECTRONIC DEVICE

CROSS-REFERENCE

The present application is the U.S. national stage of International Patent Application No. PCT/CN2018/108198, filed on Sep. 28, 2018, which claims priority to Chinese patent application No. 201810048974.5, filed on Jan. 18, 2018, the entire disclosures of which are incorporated herein by reference as part of the present application.

TECHNICAL FIELD

Embodiments of the present disclosure relate to a light source module and an electronic device.

BACKGROUND

A light source module is widely used in display devices and lighting fields. However, the current light source module usually has a large light emitting angle (for example, 120-160 degrees); that is, light emitted from the light source module is transmitted in multiple directions, thus causing the light emitted from the light source module to have a large spatial angle while transmitting in space, and causing brightness (that is, light emission intensity per unit projection area) of the light source module to be lower. For example, although the display device including the light source module has a larger viewing angle, the larger viewing angle is not conducive for the display device to realize an anti-peeping function. For example, a lamp including the light source module has a large divergence angle, so that under the condition that the power of the lamp is fixed, an increase of the divergence angle will cause the brightness of the lamp to decrease, thus degrading the user's experience of usage.

SUMMARY

At least one embodiment of the present disclosure provides a light source module, and the light source module includes an optical waveguide structure, a first light source, and a pre-collimating optical element. The optical waveguide structure includes a light introduction part and a main body part which are provided in parallel in a first direction, the light introduction part includes a light incident surface, and the main body part includes a light emitting surface. The first light source is opposite to the light introduction part in the first direction, and is configured to provide first light; and the pre-collimating optical element is provided between the first light source and the light introduction part in the first direction, and is configured to collimate at least a portion of the first light to be first collimated light. The light introduction part is configured to introduce at least a portion of the first collimated light, which is incident from the light incident surface, into the main body part at a first angle with respect to the light emitting surface to satisfy a total reflection condition of the main body part.

For example, in the light source module provided by at least one embodiment of the present disclosure, the light introduction part includes a first inclined reflecting surface; an included angle between the first inclined reflecting surface and the light incident surface is an acute angle; and the first inclined reflecting surface is configured to reflect at least the portion of the first collimated light that is incident from the light incident surface.

For example, in the light source module provided by at least one embodiment of the present disclosure, a shape of an orthographic projection of the light introduction part on a first projection plane that is perpendicular to both the light incident surface and the light emitting surface is a right-angle trapezoid.

For example, in the light source module provided by at least one embodiment of the present disclosure, the light source module further includes a base substrate, configured to support the optical waveguide structure. The base substrate is provided at a side of the first inclined reflecting surface away from the first light source, and a part, corresponding to the main body part, of the base substrate is provided at a side of the main body part opposite to the light emitting surface.

For example, in the light source module provided by at least one embodiment of the present disclosure, the base substrate includes a second inclined reflecting surface and a supporting surface; and the second inclined reflecting surface is parallel to the first inclined reflecting surface, and the supporting surface is parallel to the light emitting surface.

For example, in the light source module provided by at least one embodiment of the present disclosure, a refractive index of the light introduction part is greater than a refractive index of the base substrate, and the first inclined reflecting surface and the second inclined reflecting surface are in direct contact to form a total reflection interface.

For example, in the light source module provided by at least one embodiment of the present disclosure, the light source module further includes a reflective film. The reflective film is provided on the first inclined reflecting surface and/or the second inclined reflecting surface, and is configured to reflect the first collimated light incident on the reflective film.

For example, in the light source module provided by at least one embodiment of the present disclosure, the light source module further includes an inclined reflecting structure. The light introduction part includes an optical grating substrate and a coupling optical grating on a light incident surface of the optical grating substrate; an included angle between the inclined reflecting structure and the light incident surface of the optical grating substrate is an acute angle; the coupling optical grating is provided between the pre-collimating optical element and the main body part in the first direction, and is configured to receive the first collimated light reflected by the inclined reflecting structure; and the coupling optical grating is further configured to introduce the first collimated light satisfying a predetermined incident angle into the main body part.

For example, in the light source module provided by at least one embodiment of the present disclosure, the light source module further includes at least one of light leading-out structures. The at least one light leading-out structure is provided on the light emitting surface, and is configured to introduce at least the portion of the first collimated light transmitted in the optical waveguide structure out of the light source module at a same angle.

For example, in the light source module provided by at least one embodiment of the present disclosure, the at least one light leading-out structure includes a plurality of optical grating strips spaced apart in the first direction.

For example, in the light source module provided by at least one embodiment of the present disclosure, the light source module further includes a plurality of light leading-out structures arranged in an array.

For example, in the light source module provided by at least one embodiment of the present disclosure, the second light source and the third light source are both opposite to the light incident surface, and are respectively configured to provide second light and third light; and the pre-collimating optical element is further configured to collimate at least a portion of the second light to be second collimated light and to collimate at least a portion of the third light to be third collimated light, respectively.

For example, in the light source module provided by at least one embodiment of the present disclosure, a pitch between the first light source and the pre-collimating optical element in the first direction, a pitch between the second light source and the pre-collimating optical element in the first direction, and a pitch between the third light source and the pre-collimating optical element in the first direction are all equal to a focal length of the pre-collimating optical element.

For example, in the light source module provided by at least one embodiment of the present disclosure, the pre-collimating optical element is further configured to allow the first collimated light, the second collimated light, and the third collimated light to be incident into the light introduction part at mutually different angles with respect to the light emitting surface; and the light introduction part is further configured to introduce at least the portion of the second collimated light into the main body part at a second angle with respect to the light emitting surface and to introduce at least the portion of the third collimated light into the main body part at a third angle with respect to the light emitting surface, respectively.

For example, in the light source module provided by at least one embodiment of the present disclosure, the light source module further includes at least one light leading-out structure. The at least one light leading-out structure is further configured to allow the first collimated light, the second collimated light, and the third collimated light to leave the light source module at an angle perpendicular to the light emitting surface.

For example, in the light source module provided by at least one embodiment of the present disclosure, a wavelength $\lambda1$ of the first light, a distance a1 between the first light source and a second projection plane, a pitch P of the plurality of optical grating strips in the first direction, and a included angle $\beta$ between the first inclined reflecting surface and a plane parallel to the light emitting surface satisfy a following relationship: $n2 \times \sin(\gamma1') = n \times \sin[\pi/2 - \arctan(a1/F) - 2\beta] - m \times \lambda1/P$; F is a focal length of the pre-collimating optical element, P is a period of the plurality of optical grating strips in the at least one light leading-out structure, m is an integer, $\gamma1'$ is an angle at which the first collimated light leaves the light source module, n is a refractive index of the main body part, and n2 is a refractive index of a medium into which the first collimated light enters after leaving the light source module; and the second projection plane is parallel to the light emitting surface, and a main optical axis of the pre-collimating optical element is in the second projection plane.

For example, in the light source module provided by at least one embodiment of the present disclosure, the light source module further includes a second light source and a third light source. A wavelength $\lambda2$ of the second light, a wavelength $\lambda3$ of the third light, a distance a2 between the second light source and the second projection plane, a distance a3 between the third light source and the second projection plane, a pitch P of the plurality of optical grating strips in the first direction, and an included angle $\beta$ between the first inclined reflecting surface and a plane parallel to the light emitting surface satisfy following relationships: $n2 \times \sin(\gamma2') = n \times \sin[\pi/2 - \arctan(a2/F) - 2\beta] - m \times \lambda2/P$, and $n2 \times \sin(\gamma3') = n \times \sin[\pi/2 - \arctan(a3/F) - 2\beta] - m \times \lambda3/P$; $\gamma2'$ is an angle at which the second collimated light leaves the light source module, and $\gamma3'$ is an angle at which the third collimated light leaves the light source module.

For example, in the light source module provided by at least one embodiment of the present disclosure, the wavelength $\lambda1$ of the first light, the wavelength $\lambda2$ of the second light, the wavelength $\lambda3$ of the third light, the distance a1 between the first light source and the second projection plane, the distance a2 between the second light source and the second projection plane, and the distance a3 between the third light source and the second projection plane satisfy following relationships: $\lambda1 < \lambda2 < \lambda3$, and $a1 > a2 > a3$.

At least one embodiment of the present disclosure further provides an electronic device, and the electronic device includes the light source module according to any one of embodiments of the present disclosure.

For example, in the electronic device provided by at least one embodiment of the present disclosure, the electronic device further includes a display substrate. The display substrate includes display pixels arranged in an array; the light source module includes light leading-out structures arranged in an array; and the light leading-out structures correspond to the display pixels one by one.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1A:
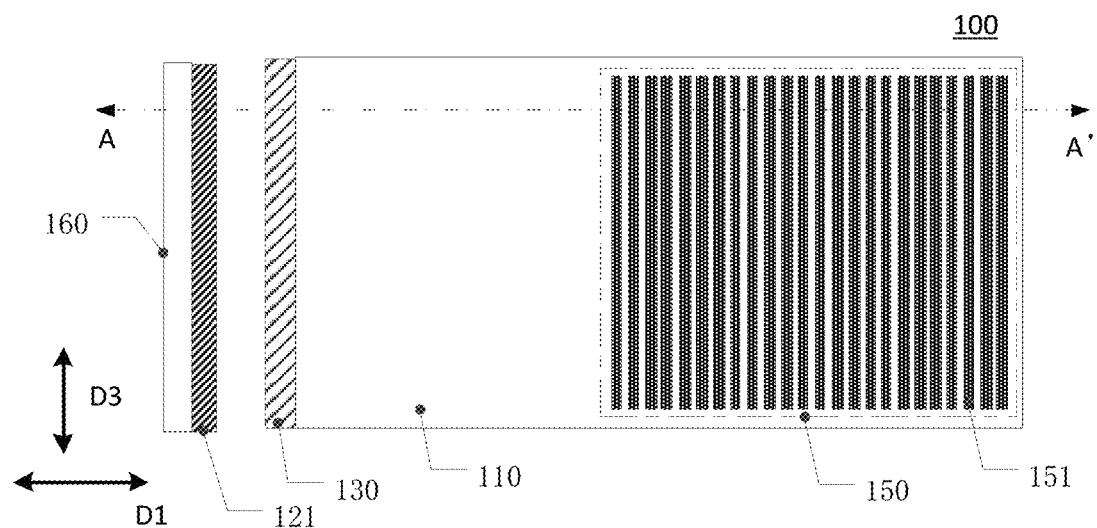
FIG. 1A is a schematic plane view of a light source module according to at least one embodiment of the present disclosure.

In order to make the objects, technical schemes and advantages of the present disclosure more clear, the technical scheme of the embodiments of the present disclosure will be clearly and completely describe in conjunction with the accompanying drawings of the embodiments of the present disclosure. Obviously, described embodiments are part of the embodiments of the present disclosure, not all of the embodiments. Based on the described embodiments of the present disclosure, all of other embodiments acquired by those skilled in the art without the need for creative work are fall within the scope of the protection of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. Also, the terms such as "a," "an" or "the" etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventors of the present disclosure notice that in order to reduce an divergence angle of the emitting light of the light source module, a black matrix can be used to block a part of the emitting light with a larger divergence angle. However, this method will reduce a luminous efficiency of devices including the light source module (for example, lighting devices or display devices), resulting in an increase in energy consumption.

The inventors of the present disclosure also notice that a light transmission direction of a current collimated light source element (for example, a light source module) is related to a wavelength of the light. Therefore, in the case where the light source module emits light of multiple colors (for example, red, green, and blue), it is difficult to realize the technical goal of transmitting light of different colors in a same direction, and it causes color shift to the light emitting light at a large angle. For example, in the case where the user observes the light source module at a large angle with respect to the normal direction of the light emitting surface of the light source module, it is possible to observe reddish light instead of white light.

Embodiments of the present disclosure provide a light source module and an electronic device which is, for example, a display device. The light source module can realize collimated emission of light without shielding by using a black matrix, and can reduce the viewing angle of the display device including the light source module.

At least one embodiment of the present disclosure provides a light source module, and the light source module includes an optical waveguide structure, a first light source, and a pre-collimating optical element. The optical waveguide structure includes a light introduction part and a main body part which are provided in parallel in a first direction, the light introduction part includes a light incident surface, and the main body part includes a light emitting surface; the first light source is opposite to the light introduction part in the first direction, and is configured to provide first light; and the pre-collimating optical element is provided between the first light source and the light introduction part in the first direction, and is configured to collimate at least a portion of the first light to be first collimated light; the light introduction part is configured to introduce at least a portion of the first collimated light, which is incident from the light incident surface, into the main body part at a first angle with respect to the light emitting surface to satisfy a total reflection condition of the main body part.

The light source module provided by the embodiments of the present disclosure will be described below by several examples without limitation. As described below, different features in these specific examples can be combined with each other under condition of no conflicts, so as to obtain new examples, which are also within the scope of protection of the present disclosure.

Figure 1B:
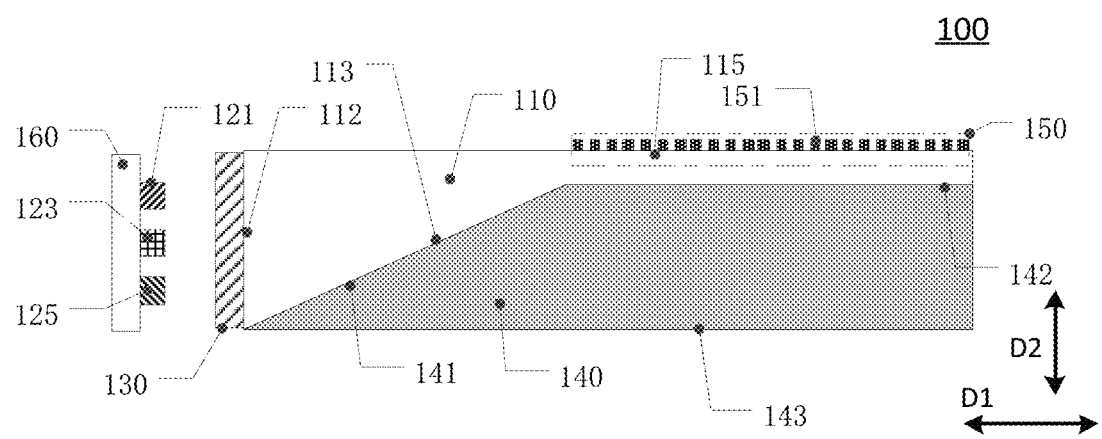
FIG. 1B is a schematic cross-sectional view of the light source module as shown in FIG. 1A along line A-A'.

The embodiments of the present disclosure provide a light source module 100, and the light source module 100 can be used as a backlight source (for example, a rear backlight or a front backlight) of a display device. For example, FIG. 1A and FIG. 1B show a schematic plan view and a schematic cross-sectional view of the light source module 100 provided by at least one embodiment of the present disclosure, and the schematic cross-sectional view shown in FIG. 1B is taken along line A-A' as shown in FIG. 1A. For example, as shown in FIG. 1A and FIG. 1B, the light source module 100 includes an optical waveguide structure 110, a first light source 121, and a pre-collimating optical element 130.

Figure 2:
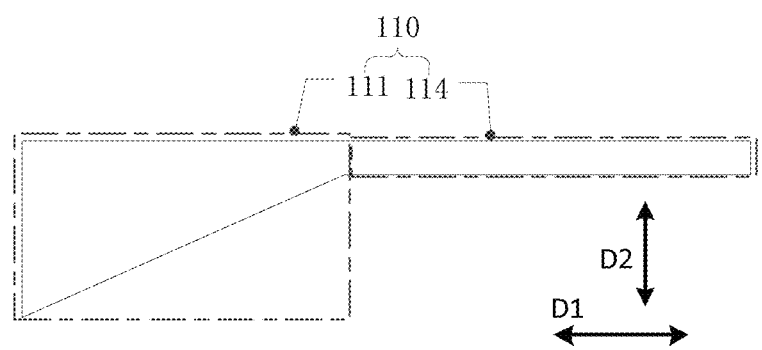
FIG. 2 is schematic cross-sectional view of an optical waveguide structure according to at least one embodiment of the present disclosure.

For example, as shown in FIG. 1B and FIG. 2, the optical waveguide structure 110 may include a light introduction part 111 and a main body part 114 which are arranged in parallel in a first direction D1. For example, the light introduction part 111 and the main body part 114 may be integrally formed, that is, there is no interface between the light introduction part 111 and the main body part 114.

For example, as shown in FIG. 1B, the light introduction part 111 may include a light incident surface 112 and a first inclined reflecting surface 113. The included angle between the first inclined reflecting surface 113 and the light incident surface 112 may be an acute angle, and the first inclined reflecting surface 113 may be configured to reflect at least part of the first collimated light 127 that is incident from the light incident surface 112 (referring to FIG. 5A). For example, as shown in FIG. 1B and FIG. 2, the main body part 114 may include a light emitting surface 115. For example, as shown in FIG. 1B, the light incident surface 112 may be perpendicular to the light emitting surface 115, but the embodiments of the present disclosure are not limited thereto.

For example, as shown in FIG. 1B, a shape of an orthographic projection of the light introduction part 111 on a first projection plane (that is, the paper surface in FIG. 1B) perpendicular to both the light incident surface 112 and the light emitting surface 115 may be a right-angled trapezoid, but the embodiments of the present disclosure are not limited thereto. For example, a shape of the main body part 114 may be a flat plate, and a shape of an orthographic projection of the main body part 114 on the first projection plane that is perpendicular to both the light incident surface 112 and the light emitting surface 115 may be rectangular, but the embodiments of the present disclosure are not limited thereto. For example, for the sake of clarity, specific arrangement modes of the light introduction part 111 and the main body part 114 will be described in detail later, and will not be described here again.

Figure 3A:
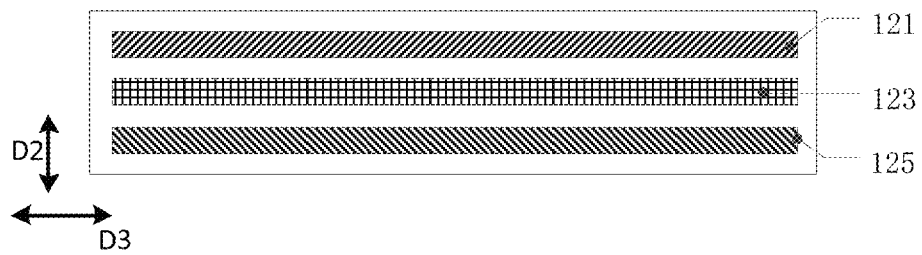
FIG. 3A is a schematic diagram of a first light source, a second light source, and a third light source according to at least one embodiment of the present disclosure.
Figure 3B:
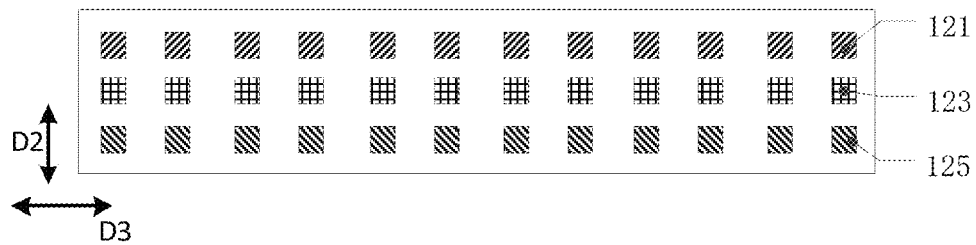
FIG. 3B is a schematic diagram of another first light source, another second light source, and another third light source according to at least one embodiment of the present disclosure.

For example, as shown FIG. 1A and FIG. 1B, the first light source 121 and the light introduction part 111 are provided opposite to each other in the first direction D1. For example, the first light source 121 may comprise at least one selected from the group consisting of an inorganic light-emitting diode (for example, a micro-LED), an organic light-emitting diode, and a laser diode, but embodiments of the present disclosure are not limited thereto. For example, as shown in FIG. 3A, the first light source 121 may include a stripe-shaped light source extending in a third direction D3. For another example, as shown in FIG. 3B, the first light source 121 may also include a plurality of inorganic light emitting diodes or organic light emitting diodes sequentially arranged in the third direction D3.

For example, the thickness of the first light source 121 in a second direction D2 may be less than 200 micrometers, but embodiments of the present disclosure are not limited thereto. For example, in the case where the first light source 121 is a stripe-shaped light source extending in the third direction D3, the length of the first light source 121 in the third direction D3 may be substantially equal to or slightly smaller than the size of the light introduction part 111 in the third direction D3, but embodiments of the present disclosure are not limited thereto. For example, the first direction D1 may intersect with (for example, be perpendicular to) the second direction D2, but embodiments of the present disclosure are not limited thereto.

Figure 5A:
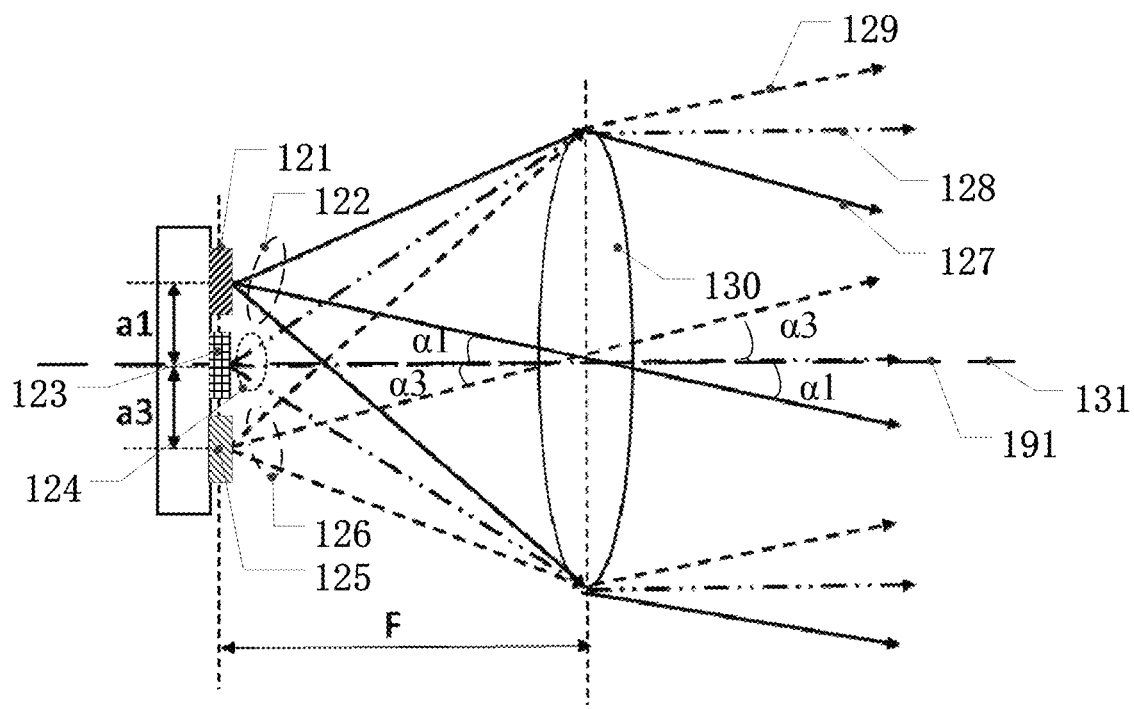
FIG. 5A is a schematic diagram for illustrating that a pre-collimating optical element provided in at least one embodiment of the present disclosure collimates a first light ray, a second light ray and a third light ray.

For example, as shown in FIG. 5A, the first light source 121 may be configured to provide first light 122. For example, the wavelength $\lambda 1$ of the first light 122 may be 410-485 nanometers, that is, the first light 122 may be blue light. For example, the first light 122 provided by the first light source 121 has a certain divergence angle, for example, the divergence angle of the first light 122 is 15 to 55 degrees, but the embodiments of the present disclosure are not limited thereto.

For example, as shown in FIG. 1B, the pre-collimating optical element 130 is provided between the first light source 121 and the light introduction part 111 in the first direction D1, and may be configured to collimate at least part of the first light 122 into the first collimated light 127 (see FIG. 5A). It should be noted that the pre-collimating optical element 130 collimates the at least part of the first light 122 into the first collimated light 127, which means that the pre-collimating optical element 130 can allow the first collimated light 127 to have a very small divergence angle. For example, the divergence angle of the first collimated light 127 may be less than 0.5 degrees. For another example, the pre-collimating optical element 130 may also allow the first collimated light 127 to have exactly a same transmission direction.

Figure 4A:
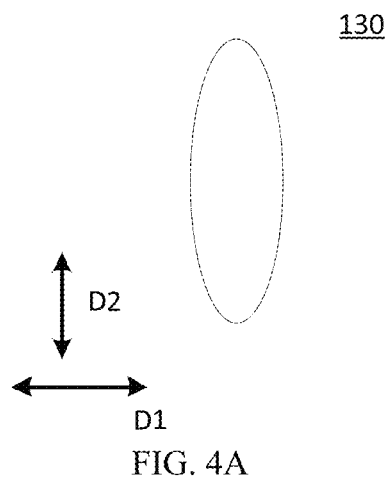
FIG. 4A is a schematic diagram of an orthographic projection of a pre-collimating optical element on a plane parallel to both a first direction and a second direction according to at least one embodiment of the present disclosure.
Figure 4B:
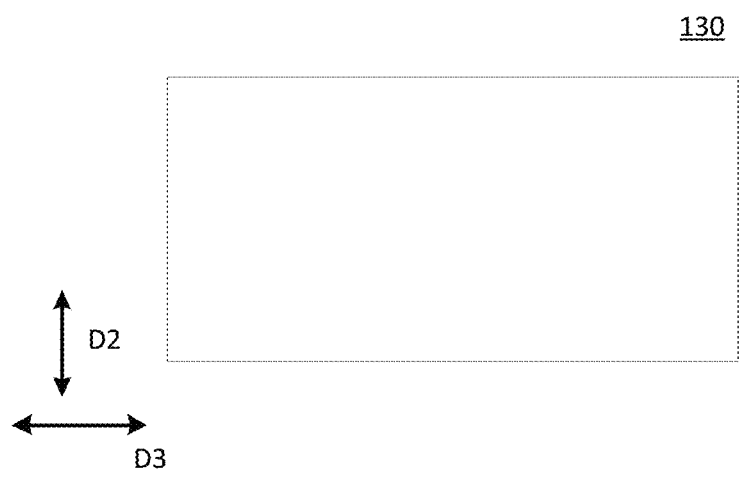
FIG. 4B is a schematic diagram of an orthographic projection of the pre-collimating optical element as shown in FIG. 4A on a plane parallel to both the second direction and a third direction.

For example, the pre-collimating optical element 130 may be a lens (for example, a cylindrical lens or a Fresnel lens), a prism, an optical grating, etc., but the embodiments of the present disclosure are not limited thereto. For example, in the case where the pre-collimating optical element 130 is a cylindrical lens, the pre-collimating optical element 130 may be a plano-convex cylindrical lens, but embodiments of the present disclosure are not limited thereto; For example, as shown in FIG. 4A, FIG. 4B and FIG. 5A, the pre-collimating optical element 130 may also be a biconvex cylindrical lens.

Figure 5B:
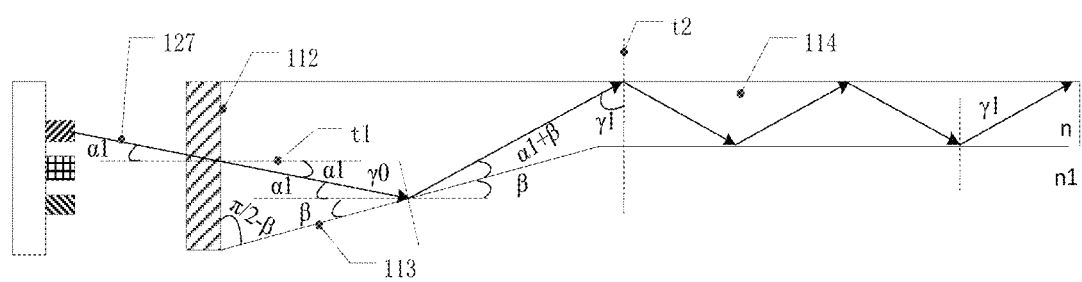
FIG. 5B is a diagram for illustrating an exemplary optical path of first collimated light in an optical waveguide structure according to at least one embodiment of the present disclosure.

For example, as shown in FIG. 5A, the pitch between the first light source 121 and the pre-collimating optical element 130 in the first direction D1 may be equal to the focal length F of the pre-collimating optical element 130, that is, the first light source 121 (for example, the light emitting surface of the first light source 121) may be located on the plane where the focal plane of the pre-collimating optical element 130 is located, whereby the first light 122 emitted by the first light source 121 located on the focal plane of the pre-collimating optical element 130 may be collimated by the pre-collimating optical element 130 into the first collimated light 127. In this case, the included angle between the first collimated light 127 and the main optical axis 131 of the pre-collimated optical element 130 satisfies $\alpha 1 = \arctan(a1/F)$; a1 is the distance between the first light source 121 and a second projection plane 191. The second projection plane 191 is parallel to the light emitting surface 115 of the light introduction part 111, and the main optical axis 131 of the pre-collimating optical element 130 is located in the second projection plane 191. Therefore, as shown in FIG. 5B and FIG. 1B, the first collimated light 127 can be incident onto the light incident surface 112 and the first inclined reflecting surface 113 of the light introduction part 111, the included angle between the first collimated light 127 and the normal direction t1 of the light incident surface 112 is $\alpha 1$, and the included angle between the first collimated light 127 and the first inclined reflecting surface 113 is $\alpha 1+\beta=\beta+\arctan(a1/F)$; $\beta$ is the included angle (an acute angle) between the first inclined reflecting surface 113 and a plane parallel to the light emitting surface 115.

For example, as shown in FIG. 5B, in the case where the refractive index of the optical waveguide structure 110 is n, the refractive index of that medium (for example, air or a base substrate 140) in contact with the optical waveguide structure 110 is n1, and the included angle $\gamma 0$ between the first collimated light 127 and the normal line of the first inclined reflection surface 113 is greater than $\gamma c=\arcsin(n1/n)$, the first collimated light 127 satisfies the total reflection condition of the first inclined reflecting surface 113; that is, under condition of $\pi/2-(\alpha 1+\beta)\geq \arcsin(n1/n)$, the first collimated light 127 satisfies the total reflection condition of the first inclined reflecting surface 113. In this case, the light introduction part 111 may introduce at least a portion of the first collimated light 127 (for example, all of the first collimated light 127) incident from the light incident surface 112 into the main body part 114 at a first angle $\gamma 1=\pi/2-\alpha 1-2\beta$ with respect to the light emitting surface 115. For example, in the case of $\gamma 1=\pi/2-\alpha 1-2\beta \geq \gamma c=\arcsin(n1/n)$, the first collimated light 127 satisfies the total reflection condition of the main body part 114. It should be noted that the first angle with respect to the light emitting surface 115 refers to the included angle $\gamma 1$ between the first collimated light 127 and the normal direction t2 of the light emitting surface 115.

For example, as shown in FIG. 1B, according to actual application requirements, the light source module 100 may further include a base substrate 140, and, for example, the base substrate 140 may be configured to support the optical waveguide structure 110 and provide an auxiliary optical function. For example, as shown in FIG. 1B, the base substrate 140 may be provided on a side of the first inclined reflecting surface 113 away from the first light source 121, and a part of the base substrate 140 corresponding to the main body part 114 may be provided opposite to the main body part 114. For example, a part of the base substrate 140 corresponding to the main body part 114 may be provided on the side of the main body part 114 opposite to the light emitting surface 115, but the embodiments of the present disclosure are not limited thereto. For example, as shown in FIG. 1B, the base substrate 140 may include a second inclined reflecting surface 141 and a supporting surface 142. The second inclined reflecting surface 141 may be parallel to the first inclined reflecting surface 113, and the supporting surface 142 may be parallel to the light emitting surface 115. For example, according to actual application requirements, the base substrate 140 may further include a second supporting surface 143, and the second supporting surface 143, for example, may be parallel to the supporting surface 142. For example, in the case where the second supporting surface 143 is parallel to the supporting surface 142, the included angle between the second inclined reflecting surface 141 and the second supporting surface 143 is $\beta$.

For example, as shown in FIG. 1B, the first inclined reflecting surface 113 and the second inclined reflecting surface 141 may be in direct contact. For example, in the case where the first inclined reflecting surface 113 and the second inclined reflecting surface 141 are in direct contact, the refractive index of the material for manufacturing the optical waveguide structure 110 (that is, the refractive index n of the optical waveguide structure 110) needs to be greater than the refractive index n1 of the base substrate 140, so that at least a portion (for example, all) of the light incident into the optical waveguide structure 110 can satisfy the total reflection condition of the optical waveguide structure 110 (that is, the total reflection condition of the first inclined reflecting surface 113). For example, the difference n−n1 between the refractive index n of the optical waveguide structure 110 and the refractive index n1 of the base substrate 140 may be greater than 0.1. For example, the material for manufacturing the base substrate 140 may be glass or polymethyl methacrylate (PMMA), but the embodiments of the present disclosure are not limited thereto.

For example, in the case where the refractive index of the optical waveguide structure 110 is n=1.8, and the refractive index n1 of the base substrate 140 is 1.5, the critical angle $\gamma c$ of total reflection of the optical waveguide structure 110 is 56 degrees. For example, in the case where the refractive index n1 of the external medium of the optical waveguide structure 110 is constant, the critical angle of total reflection of the optical waveguide structure 110 decreases with the increase of the refractive index n of the material of the optical waveguide structure 110, that is, the greater the refractive index n of the material of the optical waveguide structure 110, the easier it is for light to satisfy the total reflection condition of the optical waveguide structure 110.

For example, the material for manufacturing the optical waveguide structure 110 can be set according to actual application requirements, and the embodiments of the present disclosure are not specifically limited to this. For example, the material for manufacturing the optical waveguide structure 110 may be silicon nitride (Si3N4), and the refractive index of the silicon nitride is about 1.6-2.0. For another example, the material for manufacturing the optical waveguide structure 110 may further be indium tin oxide (ITO), and the refractive index of indium tin oxide is about 1.7. For still another example, the material for manufacturing the optical waveguide structure 110 may still further be quartz glass (SiO2), and the refractive index of quartz glass is about 1.45-1.6.

For example, the material for manufacturing the optical waveguide structure 110 may be selected to be a material having high transmittance performance for visible light (that is, a small absorption coefficient for visible light). In this case, the light source module 100 can not only be used as a backlight source of a display device (that is, the light source module 100 is farther away from a user side than the display pixels of the display device), but the light source module 100 can also be used as a front light source of the display device (that is, the light source module 100 is closer to the user side than the display pixels of the display device).

Figure 6A:
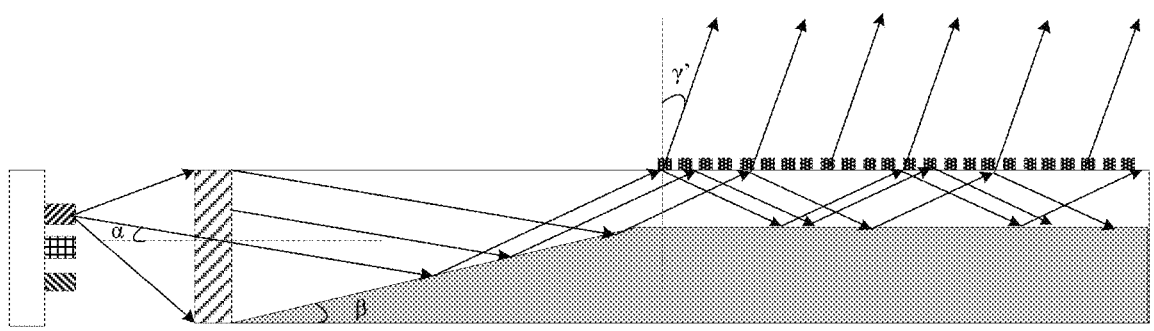
FIG. 6A is a diagram for illustrating a transmission direction of emergent light of the light source module as shown in FIG. 1A.
Figure 6B:
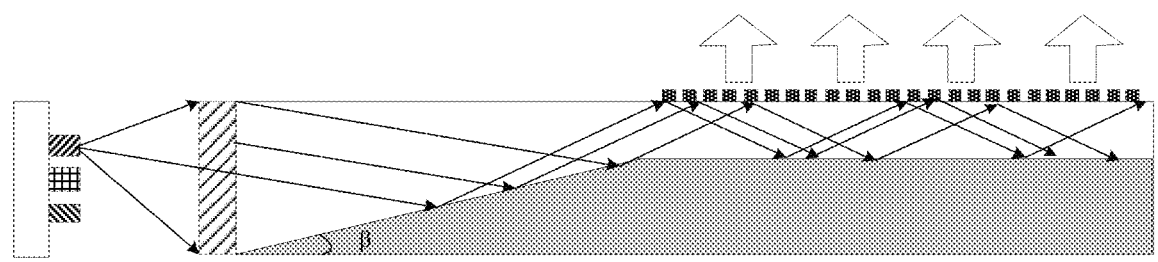
FIG. 6B is a diagram for illustrating another transmission direction of emergent light of the light source module as shown in FIG. 1A.

For example, according to actual application requirements, as shown in FIG. 1A, FIG. 1B, FIG. 7A, and FIG. 7B, the light source module 100 may further include at least one light leading-out structure 150, and the at least one the light leading-out structure 150 may be provided on the light emitting surface 115. For example, as shown in FIG. 6A, the at least one light leading-out structure 150 may be configured to introduce at least part of the first collimated light 127, which is transmitted in the optical waveguide structure 110, out of the light source module 100 at a same angle; that is, when the at least part of the first collimated light 127 leaves the light source module 100, the included angle (an acute angle) $\gamma'$ between the first collimated light 127 and the light emitting surface 115 is the same. For example, as shown in FIG. 6B, according to actual application requirements, the at least one light leading-out structure 150 may be configured to allow the first collimated light 127 to leave the light source module 100 at the angle perpendicular to the light emitting surface 115.

For example, the specific structure of the at least one of the light leading-out structures 150 can be set according to actual application requirements, and the embodiments of the present disclosure are not specifically limited to this.

For example, as shown in FIG. 1A and FIG. 1B, the light source module 100 may include one light leading-out structure 150, and the light leading-out structure 150 may include a plurality of optical grating strips 151 spaced apart in the first direction D1. In this case, the light leading-out structure 150 may be a diffraction optical grating (for example, a transmissive diffraction optical grating or a reflective diffraction optical grating), but the embodiments of the present disclosure are not limited thereto. For example, the embodiments of the present disclosure will be described in detail by taking the light leading-out structure 150 as a transmissive diffraction optical grating for example, but the light leading-out structure 150 of the embodiments of the present disclosure is not limited to the transmissive diffraction optical grating.

Figure 6C:
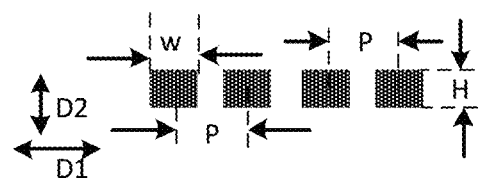
FIG. 6C is a partial enlarged view of a light leading-out structure according to at least one embodiment of the present disclosure.

For example, as shown in FIG. 1A, each of the optical grating strips 151 extends in the third direction D3. The length of each of the optical grating strips 151 in the third direction D3 may be substantially equal to or slightly smaller than the size of the optical waveguide structure 110 in the third direction D3. For example, the pitch between any two adjacent optical grating strips 151 (for example, the distance between symmetry axes of any two adjacent optical grating strips 151 in the first direction D1) may be equal, that is, the plurality of optical grating strips 151 may be uniformly arranged in the first direction D1. For example, as shown in FIG. 6C, the pitch between the center lines (for example, symmetry axes) of any two adjacent optical grating strips 151 in the first direction D1 may be P. For example, the third direction D3 may intersect with (for example, be perpendicular to) both the first direction D1 and the second direction D2, but embodiments of the present disclosure are not limited thereto. For example, the first direction D1, the second direction D2, and the third direction D3 may intersect with each other (e.g., be perpendicular to each other), but embodiments of the present disclosure are not limited thereto.

Figure 6D:
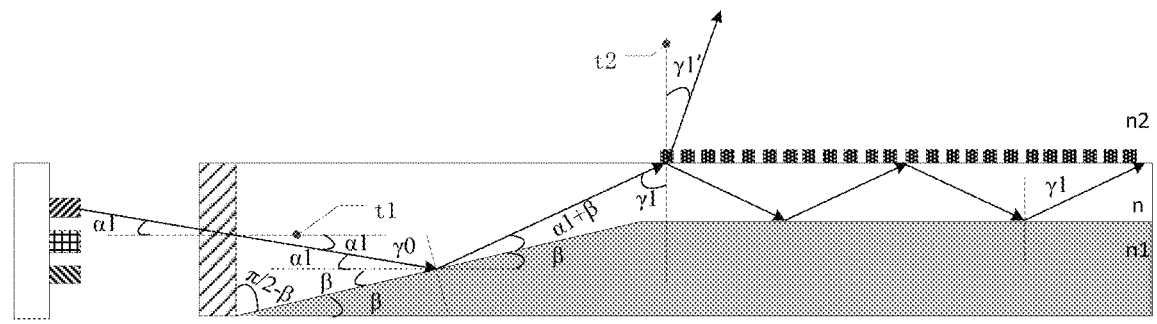
FIG. 6D is an exemplary optical path diagram for illustrating the light source module as shown in FIG. 1A.

For example, as shown in FIG. 6D, the included angle $\gamma 1$ between the first collimated light 127 transmitted in the main body part 114 (that is, the first collimated light 127 incident on the light emitting surface 115) and the normal direction t2 of the light emitting surface 115, the included angle $\gamma 1'$ between the first collimated light 127 emitted from the light source module 100 (that is, the first collimated light 127 emitted from the light emitting surface 115) and the normal direction t2 of the light emitting surface 115, and the pitch P between the symmetry axes of any two adjacent optical grating strips 151 in the first direction D1 (that is, the period of the plurality of optical grating strips 151 in the light leading-out structure 150) may satisfy the following relationship: $n \times \sin \gamma 1 - n2 \times \sin \gamma 1' = m \times \lambda 1/P$. Here, m is the diffraction order of the first collimated light 127 emitted from the light emitting surface 115, and m is an integer. n is the refractive index of the main body part (or the optical waveguide structure), and n2 (for example, n2=1) is the refractive index of the medium (for example, air) into which the first collimated light enters after leaving the light source module. For example, the diffraction order m may be equal to ±1, but the embodiments of the present disclosure are not limited thereto.

For example, in the case where the period P of the plurality of optical grating strips 151 in the light leading-out structure 150 is constant, because the included angles between the first collimated light 127 incident on the light emitting surface 115 and the normal direction t2 of the light emitting surface 115 are all $\gamma 1$, the included angles between the first collimated light 127 emitted from the light emitting surface 115 and the normal direction of the light emitting surface 115 are all $\gamma 1'$, that is, the light source module 100 provided by the embodiments of the present disclosure can realize the collimated emission of light (for example, emission perpendicular to the light emitting surface 115). Therefore, the light source module 100 can realize the collimated emission of light without shielding by using a black matrix, thereby reducing the viewing angle of the display device including the light source module.

For example, the included angle $\gamma 1'$ between the first collimated light 127 emitted from the light emitting surface 115 and the normal direction t2 of the light emitting surface 115 can be set according to actual application requirements, and this is not specifically limited in the embodiments of the present disclosure. For example, $\gamma 1'$ may be equal to zero, that is, the first collimated light 127 exits perpendicular to the light emitting surface 115, and leaves the light source module 100. For example, in the case where the included angle $\gamma 1$ between the first collimated light 127 that is incident on the light emitting surface 115 and the normal direction of the light exit surface 115 is constant, the included angle $\gamma 1'$ between the first collimated light 127 emitted from the light emitting surface 115 and the normal direction of the light emitting surface 115 can be adjusted by adjusting the period P of the plurality of optical grating strips 151 in the light leading-out structure 150. For another example, as described above, $\gamma 1 = \pi/2 - \alpha 1 - 2\beta = \pi/2 - \arctan(a1/F) - 2\beta$, that is, $n2 \times \sin \gamma 1' = n \times \sin[\pi/2 - \arctan(a1/F) - 2\beta] - m \times \lambda 1/P$, therefore, the included angle $\gamma 1'$ between the first collimated light 127 emitted from the light emitting surface 115 and the normal direction of the light emitting surface 115 can also be adjusted by adjusting the distance a1 between the first light source 121 and the second projection plane 191 or the included angle $\beta$ between the first inclined reflecting surface 113 and the plane parallel to the light emitting surface 115. Thus, the degree of freedom in designing of the device (for example, a display device) including the light source module 100 can be improved.

For example, the width W of each of the optical grating strips 151 in the first direction D1 may be half of the pitch P between the symmetry axes of any two adjacent optical grating strips 151 in the first direction D1. In this case, the duty ratio of the plurality of optical grating strips 151 in the light leading-out structure 150 (that is, the ratio of the width W of the optical grating strip in the first direction D1 to the period of the plurality of optical grating strips 151 in the light leading-out structure 150) is 0.5, but the embodiments of the present disclosure are not limited thereto. For example, the height H of each of the optical grating strips 151 in the second direction D2 may be 200 nm to 1 micrometers (e.g. 300 nm), but the embodiments of the present disclosure are not limited thereto.

For example, the diffraction efficiency of the light leading-out structure 150 at a predetermined diffraction order (for example, m=1) can be adjusted by adjusting the height H each of the optical grating strips 151 in the second direction D2 and/or the duty ratio of the plurality of optical grating strips 151 in the light leading-out structure 150. For example, the diffraction efficiency (that is, the light extraction efficiency) on the first-order diffracted light may be greater than 90% by adjusting the height H each of the optical grating strips 151 in the second direction D2 and/or the duty ratio of the plurality of optical grating strips 151 in the light leading-out structure 150, but the embodiments of the present disclosure are not limited thereto. For example, in the case where the included angle γ1 between the first collimated light 127 that is incident on the light emitting surface 115 and the normal direction of the light emitting surface 115 and the duty ratio of the plurality of optical grating strips 151 in the light leading-out structure 150 are both constant, the phase difference in the gap between an optical grating strip 151 and its adjacent optical grating strip 151 can be enabled to be odd multiples of the half wavelength by adjusting the height H of the grating strip 151 in the second direction D2. In this case, the zero-order diffracted light is coherently cancelled, so that the coherence of the zero-order diffracted light can be weakened, and the first-order diffracted light can be enhanced, thereby improving the light extraction efficiency of the light source module 100 provided by the embodiments of the present disclosure.

For example, according to actual application requirements, the light source module 100 may further include a reflecting structure (not shown in the figure), which may be provided on the side of the optical waveguide structure 110 opposite to the light incident surface 112 (that is, on the rightmost side of the optical waveguide structure 110 in FIG. 2). Therefore, the light incident on the side opposite to the light incident surface 112 can be returned to the optical waveguide structure 110, thereby further improving the efficiency of the light source module 100.

Figure 7A:
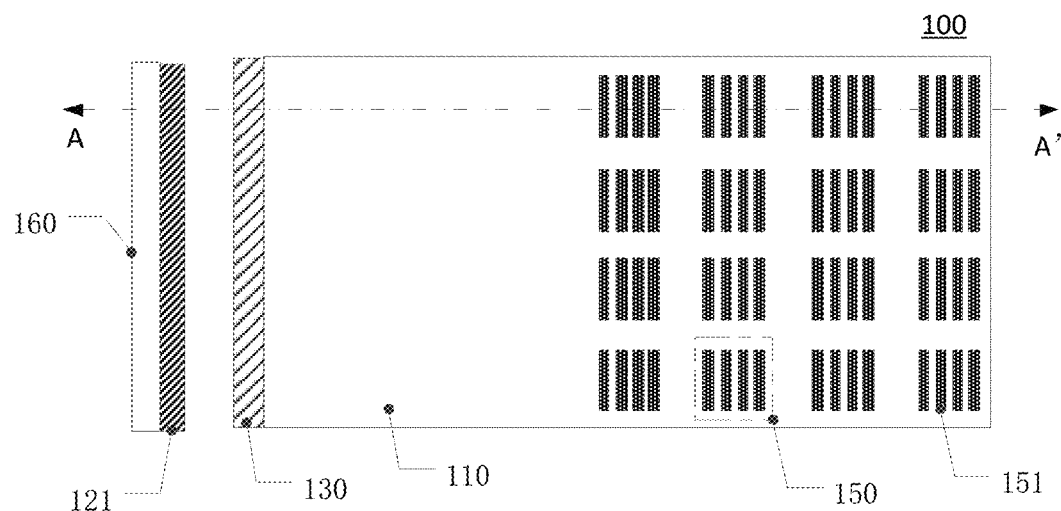
FIG. 7A is a schematic plane view of another light source module according to at least one embodiment of the present disclosure.
Figure 7B:
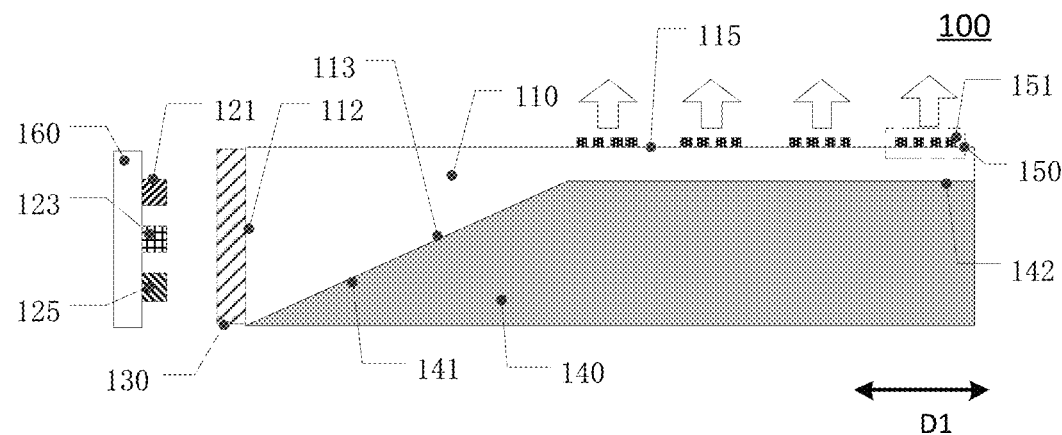
FIG. 7B is a schematic cross-sectional view of the light source module as shown in FIG. 7A along line A-A'.

For example, the light leading-out structure 150 provided by the embodiments of the present disclosure is not limited to the structure, as shown in FIG. 1A and FIG. 1B. For another example, as shown in FIG. 7A and FIG. 7B, the light source module 100 may further include a plurality of light leading-out structures 150 arranged in an array. For example, the ratio of the pitch between adjacent light leading-out structures 150 (for example, the distance between the center lines of adjacent light leading-out structures 150 in the first direction D1) to the period P of the plurality of optical grating strips 151 in each of the light leading-out structures 150 is greater than 10 (for example, 12-16), but the embodiments of the present disclosure are not limited thereto.

For example, in the case where the first collimated light 127 transmitted in the main body part 114 is incident on the light emitting surface 115 corresponding to the light leading-out structure 150, the light leading-out structure 150 can introduce at least part of the first collimated light 127 incident on the light emitting surface 115 out of the light source module 100 by diffraction. For example, in the examples as shown in FIG. 7A and FIG. 7B, in the case where the first collimated light 127 transmitted in the main body part 114 is incident on the light emitting surface 115 corresponding to the gap between adjacent light leading-out structures 150, because the pitch between adjacent light leading-out structures 150 is much larger than the period P of the plurality of optical grating strips 151 in each of the light leading-out structures 150, the first collimated light 127 cannot leave the light source module 100 by diffraction. In this case, the first collimated light 127 is reflected back into the main body part 114 by the light emitting surface 115 because the first collimated light 127 satisfies the total reflection condition of the light leading-out structure 150. Therefore, the first collimated light 127 transmitted in the main body part 114 leaves the light source module 100 via the plurality of light leading-out structures 150 arranged in an array, while no light be emitted between adjacent light leading-out structures 150. Therefore, the plurality of light leading-out structures 150 provided by the embodiments of the present disclosure can not only realize the collimated emission of light, but also realize the control of the position of the emitting light. For example, the plurality of light leading-out structures 150 may have the same structural parameters, for example, the period P of the plurality of optical grating strips 151 in each of the light leading-out structures 150 may be the same, but embodiments of the present disclosure are not limited thereto.

For example, when the light source module 100 provided in the embodiments of the present disclosure is applied to a display device, the plurality of light leading-out structures 150 may correspond to the display pixels 210 of the display substrate 200 one by one. For example, the gap between adjacent light emitting structures 150 may correspond to the black matrix 220, so that the black matrix 220 can be prevented from blocking the light emitted by the light source module 100, thereby further improving the efficiency of the display device including the light source module 100.

Figure 7C:
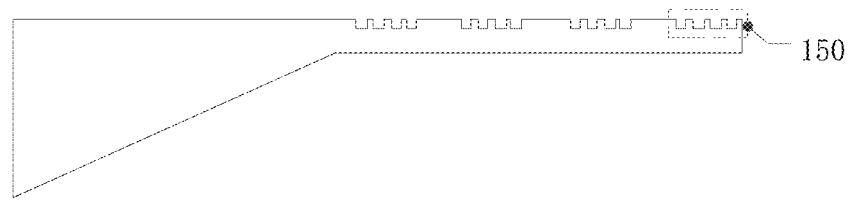
FIG. 7C is a schematic diagram of another light leading-out structure according to at least one embodiment of the present disclosure.

For example, the arrangement of the plurality of light leading-out structures 150 provided by the embodiments of the present disclosure is not limited to the arrangement as shown in FIG. 1B, that is, the plurality of optical grating strips 151 are provided on the side of the main body part 114 away from the base substrate 140. For example, as shown in FIG. 7C, the plurality of optical grating strips 151 may further be formed by forming grooves on the light emitting surface 115 of the main body part 114. For example, a laser may be used to form grooves in the light emitting surface 115 of the main body part 114, but the embodiments of the present disclosure are not limited thereto.

For example, as shown in FIG. 1B, according to actual application requirements, the light source module 100 may further include a second light source 123 and a third light source 125. The second light source 123 and the third light source 125 are provided opposite to the light incident surface 112 in the first direction D1. For example, as shown in FIG. 3A and FIG. 3B, the first light source 121, the second light source 123, and the third light source 125 may be spaced apart from each other in the second direction D2; for example, the second direction D2, the first light source 121, the second light source 123, and the third light source 125 are in order in the second direction D2. For example, the types, the shapes, and the sizes of the second light source 123 and the third light source 125 can be set with reference to the first light source 121, and will not be described here again.

For example, as shown in FIG. 5A, the second light source 123 and the third light source 125 may be configured to provide second light 124 and third light 126, respectively (referring to FIG. 5A). For example, the wavelength λ2 of the second light 124 may be 500-550 nm, and the wavelength λ3 of the third light 126 may be 620-750 nm, that is, the second light 124 and the third light 126 may be green light and red light, respectively. For example, the second light 124 and the third light 126 may have certain divergence angles, for example, the divergence angle of the second light 124 and the divergence angle of the third ray 126 are in the range of 15-55 degrees, but the embodiments of the present disclosure is not limited thereto.

For example, as shown in FIG. 5A, in the case where the light source module 100 further includes the second light source 123 and the third light source 125, the pre-collimating optical element 130 may further be configured to collimate at least part of the second light 124 and at least part of the third light 126 to be second collimated light 128 and third collimated light 129, respectively.

It should be noted that the pre-collimating optical element 130 collimates the at least part of the second light 124 and the at least part of the third light 126 into the second collimated light 128 and the third collimated light 129, respectively, which means that the pre-collimating optical element 130 can allow the second collimated light 128 and the third light 126 to have very small divergence angles. For example, the divergence angles of the second collimated light 128 and the third light 126 may be both less than 0.5 degrees. For another example, the pre-collimating optical element 130 can allow the second light 124 transmitted through the pre-collimating optical element 130 to have exactly the same transmission direction, and the pre-collimating optical element 130 can further allow the third light 126 transmitted through the pre-collimating optical element 130 to have exactly the same transmission direction.

For example, as shown in FIG. 5A, in the case where the light source module 100 further includes the second light source 123 and the third light source 125, the pitch between the third light source 125 and the pre-collimating optical element 130 in the first direction D1, the pitch between the second light source 123 and the pre-collimating optical element 130 in the first direction D1, and the pitch between the first light source 121 and the pre-collimating optical element 130 in the first direction D1 may be all equal to the focal length F of the pre-collimating optical element 130, that is, the first light source 121, the second light source 123, and the third light source 125 (that is, the light emitting surfaces of the first light source 121, the second light source 123, and the third light source 125) are all located on the plane where the focal plane of the pre-collimating optical element 130 is located. Thus, the second light 124 emitted from the second light source 123 and the third light 126 emitted from the third light source 125 located on the focal plane of the pre-collimating optical element 130 can be collimated into the second collimated light 128 and the third collimated light 129 by the pre-collimating optical element 130, respectively. In this case, the included angle $\alpha 2$ between the second collimated light 128 and the main optical axis 131 of the pre-collimating optical element 130 satisfies $\alpha 2 = \arctan(a2/f)$, and the included angle $\alpha 3$ between the third collimated light 129 and the main optical axis 131 of the pre-collimating optical element 130 satisfies $\alpha 3 = \arctan(a3/F)$, a2 is the distance between the second light source 123 and the second projection plane 191, and a3 is the distance between the third light source 125 and the second projection plane 191.

It should be noted that in order to determine whether the light source (for example, the first light source 121, the second light source 123, or the third light source 125) is located on the side of the second projection plane 191 close to the light emitting surface 115 or on the side of the second projection plane 191 away from the light emitting surface 115, the distance between the light source (for example, the first light source 121, the second light source 123, or the third light source 125) and the second projection plane 191 has a positive sign or a negative sign. In the case where the light source (for example, the first light source 121, the second light source 123, or the third light source 125) is located on the side of the second projection plane 191 close to the light emitting surface 115, the distance between the light source and the second projection plane 191 is set to a positive value, and in the case where the light source (for example, the first light source 121, the second light source 123, or the third light source 125) is located on the side of the second projection plane 191 away from the light emitting surface 115, the distance between the light source and the second projection plane 191 is set to a negative value.

For example, the first light source 121, as shown in FIG. 5A, is provided on the side of the second projection plane 191 close to the light emitting surface 115, under this case, the distance a1 between the first light source 121 and the second projection plane 191 is a positive value. For another example, the third light source 125, as shown in FIG. 5A, is provided on the side of the second projection plane 191 away from the light emitting surface 115, in this case, the distance a3 between the third light source 125 and the second projection plane 191 is a negative value. Still for another example, the distance between the second light source 123 and the second projection plane 191 is equal to zero, as shown in FIG. 5A, in this case, the included angle $\alpha 2$ between the second collimated light 128 and the main optical axis 131 of the pre-collimated optical element 130 satisfies $\alpha 2 = 0$.

It should be noted that the positions of the first light source 121, the second light source 123, or the third light source 125 with respect to the second projection plane 191, as shown in FIG. 5A, are merely examples, and the embodiments of the present disclosure are not limited thereto. The positions of the first light source 121, the second light source 123, and the third light source 125 relative to the projection plane 191 can be set according to actual application requirements.

For example, as shown in FIG. 5A, in the case where the distance between the first light source 121 and the second projection plane 191, the distance between the second light source 123 and the second projection plane 191, and the distance between the third light source 125 and the second projection plane 191 are different from each other (for example, the first light source 121, the second light source 123, and the third light source 125 are spaced apart from each other in the second direction D2), the pre-collimating optical element 130 may allow the first collimated light 127, the second collimated light 128, and the third collimated light 129 to have different transmission directions with respect to the main optical axis 131 of the pre-collimating optical element 130. Thus the pre-collimating optical element 130 may allow the first collimated light 127, the second collimated light 128, and the third collimated light 129 to be incident into the main body part 114 of the light introduction part 111 at different angles with respect to the light emitting surface 115.

Figure 8:
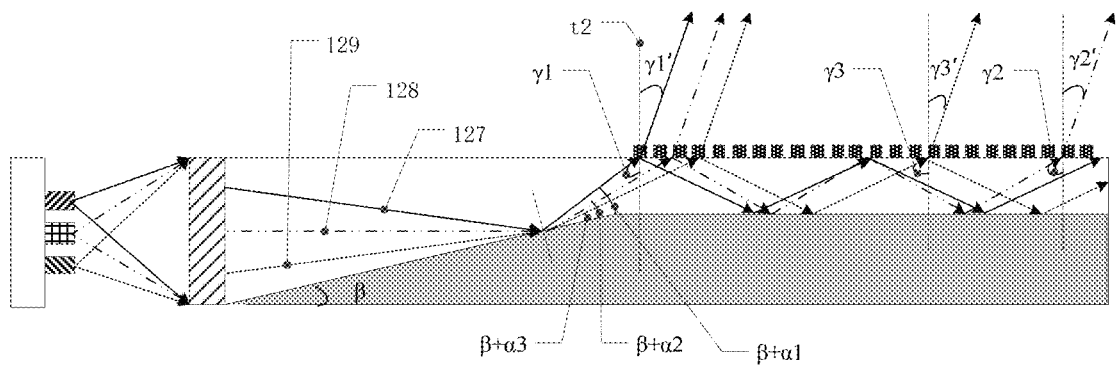
FIG. 8 is an optical path diagram of a light source module according to at least one embodiment of the present disclosure.

For example, as shown in FIG. 8, the included angle between the second collimated light 128 and the normal direction t1 of the light incident surface 112 and the included angle between the second collimated light 128 and the first inclined reflecting surface 113 are $\alpha 2$ and $\beta + \alpha 2 = \beta + \arctan(a2/F)$, respectively. The included angle between the third collimated light 129 and the normal direction t1 of the light incident surface 112 and the included angle between the third collimated light 129 and the first inclined reflecting surface 113 are $\alpha 3$ and $\beta + \alpha 3 = \beta + \arctan(a3/F)$, respectively. Thus, the light introduction part 111 may introduce at least part of the second collimated light 128 (for example, all of the second collimated light 128) that is incident from the light incident surface 112 into the main body part 114 at a second angle $\gamma 2 = \pi/2 - \alpha 2 - 2\beta = \pi/2 - 2\beta - \arctan(a2/F)$ with respect to the light emitting surface 115. Furthermore, the light introduction part 111 may further introduce at least part of the third collimated light 129 (for example, all the third collimated light 129) incident from the light incident surface 112 into the main body part 114 at a third angle $\gamma 3 = \pi/2 - \alpha 3 - 2\beta = \pi/2 - 2\beta - \arctan(a3/F)$ with respect to the light emitting surface 115. In addition, as described above, the light introduction part 111 may introduce at least part of the first collimated light 127 (for example, all of the first collimated light 127) incident from the light incident surface 112 into the main body part 114 at a first angle $\gamma1=\pi/2-\alpha1-2\beta=\pi/2-2\beta-\arctan(a1/F)$ with respect to the light emitting surface 115. For example, as shown in FIG. 8 and the above formulas, in the case where a1>a2>a3, $\gamma1<\gamma2<\gamma3$; that is, the greater the distance between the light source (the first light source 121, the second light source 123, or the third light source 125) and the second projection plane 191 is (that is, the closer the light source is to the light emitting surface 115), the smaller the included angle between the collimated light (the first collimated light 127, the second collimated light 128, or the third collimated light 129) and the normal direction t2 of the light emitting surface 115 is.

For example, as shown in FIG. 8, the included angle $\gamma2$ between the second collimated light 128 transmitted in the main body part 114 (that is, the second collimated light 128 incident on the light emitting surface 115) and the normal direction of the light emitting surface 115, the included angle $\gamma2'$ between the second collimated light 128 emitted from the light source module 100 (that is, the second collimated light 128 emitted from the light emitting surface 115) and the normal direction of the light emitting surface 115, and the period P of the plurality of optical grating strips 151 in the light leading-out structure 150 may satisfy the following relationship: $n\times\sin\gamma2-n2\times\sin\gamma2'=m\times\lambda2/P$. The angle $\gamma3$ between the third collimated light 129 transmitted in the main body part 114 (that is, the third collimated light 129 incident on the light emitting surface 115) and the normal direction of the light emitting surface 115, the angle $\gamma3'$ between the third collimated light 129 emitted from the light source module 100 (that is, the third collimated light 129 emitted from the light emitting surface 115) and the normal direction of the light emitting surface 115, and the period P of the plurality of optical grating strips 151 in the light leading-out structure 150 may satisfy the following relationship: $n\times\sin\gamma3-n2\times\sin\gamma3'=m\times\lambda3/P$. Therefore, $n2\times\sin(\gamma2')=n\times\sin[\pi/2-\arctan(a2/F)-2\beta]-m\times\lambda2/P$, $n2\times\sin(\gamma3')=n\times\sin[\pi/2-\arctan(a3/F)-2\beta]-m\times\lambda3/P$, thus, by adjusting a1 (that is, the distance between the first light source 121 and the second projection plane 191), a2 (that is, the distance between the second light source 123 and the second projection plane 191), and a3 (that is, the distance between the third light source 125 and the second projection plane 191), $\gamma1'=\gamma2'=\gamma3'$ may be achieved. That is, the first collimated light 127, the second collimated light 128, and the third collimated light 129 can leave the light source module 100 at the same angle by adjusting the values of a1, a2, and a3.

For example, in order to make the first collimated light 127, the second collimated light 128, and the third collimated light 129 leave the light source module 100 at the same angle (i.e., to satisfy $\gamma1'=\gamma2'=\gamma3'$), $n\times\sin\gamma1-m\times\lambda1/P=n\times\sin\gamma2-m\times\lambda2/P=n\times\sin\gamma3-m\times\lambda3/P$ is achieved. For example, in the case where $\lambda1$ (i.e., the wavelength of the first light 122) $<\lambda2$ (i.e., the wavelength of the second light 124) $<\lambda3$ (i.e., the wavelength of the third light 126), $\gamma1'=\gamma2'=\gamma3'$ (for example, $\gamma1'$, $\gamma2'$, and $\gamma3'$ may all be equal to zero) may be achieved, by satisfying $\gamma1<\gamma2<\gamma3$ (i.e., a1>a2>a3), that is, the first collimated light 127, the second collimated light 128, and the third collimated light 129 may leave the light source module 100 at the same angle by making the distance a1 between the first light source 121 and the second projection plane 191 greater than the distance a2 between the second light source 123 and the second projection plane 191, and making the distance a2 between the second light source 123 and the second projection plane 191 greater than the distance a3 between the third light source 125 and the third projection plane. Therefore, the light source module 100 provided by the embodiments of the present disclosure can allow the incident light of different wavelengths (or colors) to leave the light source module 100 at the same angle (for example, perpendicular to the light emitting surface 115).

For example, according to actual application requirements, the first light source 121, the second light source 123, and the third light source 125 may be provided on the light source substrate 160. The light source substrate 160 may be a glass substrate 140, a quartz substrate 140, a plastic substrate 140 (for example, a polyethylene terephthalate (PET) substrate 140), or a substrate made of other suitable materials. For example, the first light source 121, the second light source 123, and the third light source 125 may be provided on the light source substrate 160 by a transfer printing method.

For example, in the case where the first light source 121, the second light source 123, and the third light source 125 are a blue light source, a green light source, and a red light source, respectively, the collimated white light emission (for example, white light emitted perpendicular to the light emitting surface 115) can be realized by controlling the intensities of the first light 122 (i.e., blue light), the second light 124 (i.e., green light), and the third light 126 (i.e., red light) emitted by the first light source 121, the second light source 123, and the third light source 125, respectively. For example, the ratio of the intensities of the first collimated light 127, the second collimated light 128, and the third collimated light 129 emitted from the light source module 100 may be allowed to be about 1:6:3 by controlling the magnitude of the driving currents of the first light source 121, the second light source 123, and the third light source 125, but the embodiments of the present disclosure are not limited thereto. For example, the ratio of the intensities of the first collimated light 127, the second collimated light 128, and the third collimated light 129 emitted from the light source module 100 can be appropriately adjusted according to the specific values of the wavelengths of the first collimated light 127, the second collimated light 128, and the third collimated light 129, which will not be described here.

Figure 9:
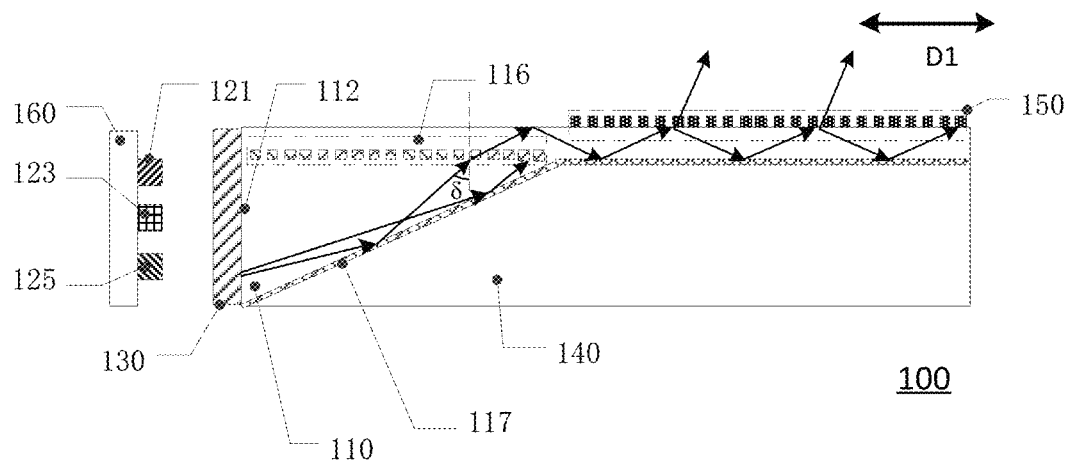
FIG. 9 is a schematic cross-sectional view of still another light source module according to at least one embodiment of the present disclosure.

For example, FIG. 9 is a schematic cross-sectional view of still another light source module according to at least one embodiment of the present disclosure. For example, as shown in FIG. 9, the light source module 100 may further include a reflective film 117. The reflective film 117 may be provided on the first inclined reflecting surface 113 or/and the second inclined reflecting surface 141, and may be configured to reflect the first collimated light 127 incident thereon. In addition, the reflective film 117 may be further provided between the supporting surface 142 and the surface of the main body part 114 on the side opposite to the light emitting surface 115. For example, the reflective film 117 has a high reflective efficiency to the first collimated light 127 (for example, the reflective efficiency of the reflective film 117 to the first collimated light 127 may be greater than 95%); in this case, the optical waveguide structure 110 and the base substrate 140 may be made of materials having the same refractive index (for example, made of the same material), thereby improving the design freedom of the light source module 100.

For example, as shown in FIG. 9, the light introduction part 111 further includes a coupling optical grating 116. For example, the coupling optical grating 116 may include a plurality of stripe-shaped optical gratings extending in the third direction D3. For example, the coupling optical gratings 116 may be provided between the pre-collimating optical element 130 and the main body part 114 in the first direction D1, and are configured to receive the first collimated light 127 reflected by the first inclined reflecting surface 113. For example, the coupling optical grating 116 may be configured to introduce the first collimated light 127 satisfying the predetermined incident angle δ into the main body part 114, and the coupling optical grating 116 may be further configured to prevent the first collimated light 127, which deviates from the predetermined incident angle δ, from being introduced into the main body part 114. Therefore, in the case where the first collimated light 127 has a small divergence angle (for example, less than 0.5%; caused by an assembly error), the first collimated light 127 emitted from the light source module 100 can be still ensured to have the same transmission direction, thereby improving the design freedom of the light source module 100 and reducing the manufacturing difficulty.

For example, as shown in FIG. 9, in the case where the light source module 100 further includes the second light source 123 and the third light source 125, the coupling optical grating 116 may be further configured to introduce the second collimated light 128 satisfying a predetermined incident angle δ2 (not shown in the figure) into the main body part 114. The coupling optical grating 116 may be further configured to prevent the second collimated light 128 deviating from the predetermined incident angle δ2 from being introduced into the main body part 114. The coupling grating 116 may be further configured to introduce the third collimated light 129 satisfying a predetermined incident angle δ3 (not shown in the figure) into the main body part 114, and the coupling optical grating 116 may be further configured to prevent the third collimated light 129 deviating from the predetermined incident angle δ3 from being introduced into the main body part 114. Therefore, in the case where the second collimated light 128 and the third collimated light 129 both have a small divergence angles (for example, less than 0.5%; caused by an assembly error), it can be still ensured that the second collimated light 128 and the third collimated light 129 emitted from the light source module 100 have the same transmission direction.

For example, the coupling optical grating 116 may be directly written into the light introduction part 111 by changing by a laser the refractive index of the region, which is irradiated by the focus point of the laser, in the light introduction part 111, but the manufacturing method of the coupling optical grating 116 is not limited thereto.

Figure 10A:
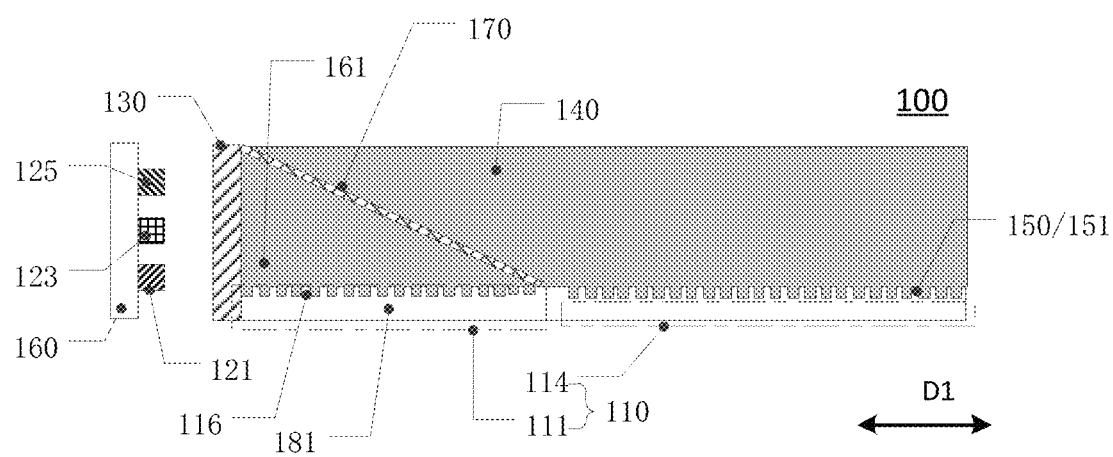
FIG. 10A is a schematic cross-sectional view of still another light source module according to at least one embodiment of the present disclosure.

For example, FIG. 10A is a schematic cross-sectional view of still another light source module according to at least one embodiment of the present disclosure. For example, as shown in FIG. 10A, the light source module 100 may include an optical waveguide structure 110, a first light source 121, and a pre-collimating optical element 130. For example, the optical waveguide structure 110 may include a light introduction part 111 and a main body part 114 arranged in parallel in the first direction D1. For example, according to actual application requirements, the light source module 100 may further include a second light source 123, a third light source 125, at least one light leading-out structure 150, and an inclined reflecting structure 170. For example, the specific arrangement of the first light source 121, the second light source 123, the third light source 125, the main body part 114, and the pre-collimating optical element 130 can be seen in the light source module 100 shown in FIG. 1A and FIG. 1B, and will not be described here.

Figure 10B:
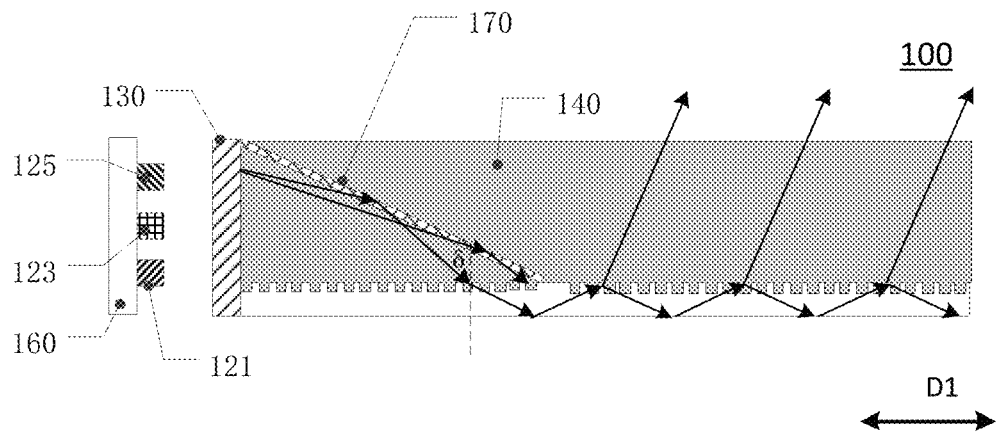
FIG. 10B is an optical path diagram of the light source module shown in FIG. 10A.

For example, as shown in FIG. 10A, the light introduction part 111 may include an optical grating substrate 181 and a coupling optical grating 116 provided on a light incident surface 182 of the optical grating substrate 181. For example, the coupling optical grating 116 may be provided between the pre-collimating optical element 130 and the main body part 114 in the first direction D1. For example, as shown in FIG. 10A, the coupling optical grating 116 may be formed in the light incident surface 182 (that is, the light incident surface of the light introduction part 111) of the optical grating substrate 181 by a method of notching groove, but the embodiments of the present disclosure are not limited thereto. For example, the included angle between the inclined reflecting structure 170 and the light incident surface 182 of the optical grating substrate 181 may be an acute angle. For example, the optical coupling grating 116 may be configured to receive the first collimated light 127 reflected by the inclined reflecting structure 170. For example, as shown in FIG. 10B, the optical coupling grating 116 may be further configured to introduce the first collimated light 127 satisfying the predetermined incident angle δ into the main body part 114, and the optical coupling grating 116 may be further configured to prevent the first collimated light 127 deviating from the predetermined incident angle δ from being introduced into the main body part 114. Therefore, in the case where the first collimated light 127 has a small divergence angle (for example, less than 0.5%; caused by an assembly error), it can be still ensured that the first collimated light 127 emitted from the light source module 100 has the same transmission direction.

For example, as shown in FIG. 10A, the light source module 100 may further include a base substrate 140. For example, the base substrate 140 as shown in FIG. 10A is similar to the base substrate 140 as shown in FIG. 1B, and differs from the base substrate 140 as shown in FIG. 1B in that the base substrate 40 as shown in FIG. 10A may further include a plurality of stripe-shaped optical gratings sequentially arranged in the first direction D1 on a side of the base substrate 140 in contact with the main body part 114. For example, the plurality of stripe-shaped optical gratings provided on the base substrate 140 correspond to the gaps between the plurality of the optical grating strips 151 provided on the main body part 114, and the height of the plurality of stripe-shaped optical gratings provided on the base substrate 140 in the second direction D2 may be equal to the height of the corresponding optical grating strips 151 in the second direction D2, so that the base substrate 140 may be in direct contact with the light emitting surface 115 of the main body part 114. For another example, the width of the stripe-shaped optical grating provided on the base substrate 140 in the first direction D1 may be equal to the width of the corresponding gap between the optical grating strips 151, so that the side surfaces, which are opposite to each other in the first direction D1, of the stripe-shaped optical grating may directly contact the side surfaces, which are opposite to each other in the first direction D1, of the corresponding optical grating strips 151. For example, the refractive index of the base substrate 140 is not equal to the refractive index of the optical waveguide structure 110, thereby enabling the light leading-out structure 150 to diffract the first collimated light 127 incident thereon, that is, the light leading-out structure 150 can enable the first collimated light 127 transmitted in the main body part 114 to leave the light source module 100.

For example, as shown in FIG. 10A, the light source module 100 may further include a second base substrate 161. For example, the second base substrate 161 and the base substrate 140 may be made of materials having the same refractive index (for example, the same material), but the embodiments of the present disclosure are not limited thereto. For example, the inclined reflecting structure 170 may be provided between the base substrate 140 and the second base substrate 161, and the surfaces of the inclined reflecting structure 170 that are oppositely provided may be in direct contact with the base substrate 140 and the second base substrate 161, respectively.

For example, the second base substrate 161 may further include a plurality of stripe-shaped optical gratings sequentially arranged in the first direction D1 on the side of the second base substrate 161 in contact with the optical grating substrate 181. For example, the plurality of stripe-shaped optical gratings provided on the second base substrate 161 correspond to the gaps between the plurality of stripe-shaped optical gratings provided on the optical grating substrate 181, and the height of the stripe-shaped optical gratings provided on the second base substrate 161 in the second direction D2 may be equal to the height of the corresponding stripe-shaped optical gratings on the optical grating substrate 181 in the second direction D2, so that the second base substrate 161 may be in direct contact with the light emitting surface 115 of the optical grating substrate 181. For another example, the width of the stripe-shaped optical grating provided on the second base substrate 161 in the first direction D1 may be equal to the width of the corresponding gap between the stripe-shaped optical gratings, so that the side surfaces, which are opposite to each other in the first direction D1, of the plurality of stripe-shaped optical gratings on the second substrate 161 may be in direct contact with the side surfaces, which are opposite to each other in the first direction D1, of the stripe-shaped optical gratings on the optical grating substrate 181. For example, the refractive index of the second base substrate 161 is not equal to the refractive index of the optical grating substrate 181, thereby enabling the coupling optical grating 116 to introduce the first collimated light 127 satisfying the predetermined incident angle δ into the main body part 114, and preventing the first collimated light 127 deviating from the predetermined incident angle δ from being introduced into the main body part 114.

It should be noted that the light emitting surface 115 in the present disclosure refers to a surface which enables the first collimated light 127 transmitted in the main body part 114 not to satisfy the total reflection condition of the main body part 114, that is, a surface on which the light leading-out structure 150 is provided. For example, in the case where the light leading-out structure 150 is a transmissive diffraction optical grating, the first collimated light 127 transmitted in the main body part 114 may leave the light source module 100 via the light emitting surface 115. For example, in the case where the light leading-out structure 150 is a reflective diffraction optical grating, the first collimated light 127 transmitted in the main body part 114 may leave the light source module 100 via a surface of the main body part 114 opposite to the light emitting surface 115.

It should be noted that, the embodiments of the present disclosure are described in detail by taking the light leading-out structure 150 provided only on the light emitting surface 115 of the main body part 114 for example, but the present disclosure is not limited to this. For example, according to actual application requirements, the light leading-out structure 150 may also be provided on the surface of the light introduction part 111 that is in the same plane as the light emitting surface 115.

Figure 11:
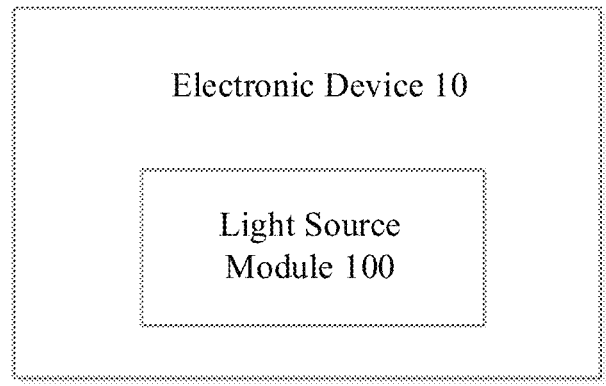
FIG. 11 is an exemplary block diagram of a display device according to at least one embodiment of the present disclosure.

At least one embodiment of the present disclosure further provides an electronic device. The electronic device may be a lighting device or a display device. For example, as shown in FIG. 11, the electronic device may include the light source module 100 provided in any embodiment of the present disclosure. For example, the lighting device can be a lamp, a bulletin board, etc. The display device can be any product or component with display function such as a mobile phone, a tablet computer, a television, a display, a notebook computer, a digital photo frame, a navigator, etc. For example, because the light source module 100 provided by the embodiments of the present disclosure can realize the collimated emission of light, the viewing angle of the display device provided by the embodiments of the present disclosure can be reduced, thereby improving the using safety of the display device (for example, preventing others from peeping at information displayed by the display device).

Figure 12A:
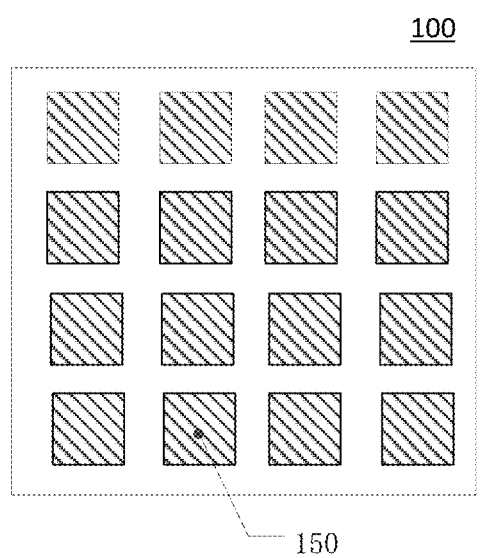
FIG. 12A is a schematic plan view of a light source module according to at least one embodiment of the present disclosure.
Figure 12B:
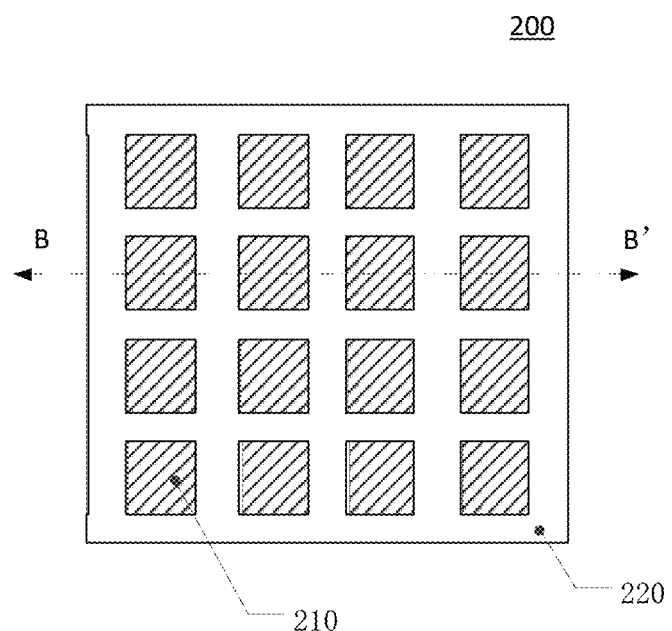
FIG. 12B is a schematic plan view of a display substrate according to at least one embodiment of the present disclosure.
Figure 12C:
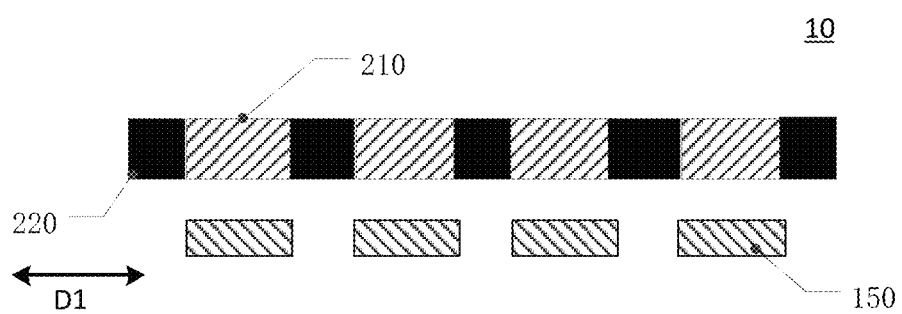
FIG. 12C is a schematic cross-sectional view of a display device according to at least one embodiment of the present disclosure.

For example, FIG. 12C is a schematic cross-sectional view of a display device according to at least one embodiment of the present disclosure. The schematic sectional view, as shown in FIG. 12C, is obtained by cutting along the line B-B' as shown in FIG. 12B. For example, FIG. 12A is a schematic plan view of a light source module 100 of a display device provided by at least one embodiment of the present disclosure. As shown in FIG. 12A, the light source module 100 includes a plurality of light leading-out structures 150 arranged in an array. For example, as shown in FIG. 12C, the display device may further include a display substrate 200. For example, as shown in FIG. 12B, the display device may include display pixels 210 arranged in an array, for example, the display device may include a black matrix 220 provided between adjacent display pixels 210. For example, as shown in FIG. 12C, the plurality of light leading-out structures 150 may correspond to the display pixels 210 one by one, and the gaps between the adjacent light leading-out structures 150 may correspond to the black matrix 220 (for example, the orthographic projection of the black matrix 220 on the light source module 100 is located in the gaps of the adjacent light leading-out structures 150, and is connected to the corresponding light leading-out structures 150). For example, by making the plurality of light leading-out structures 150 correspond to the display pixels 210 one by one, the black matrix 220 can be prevented from blocking the light emitted by the light source module 100, thereby improving the efficiency of the display device including the light source module 100. For example, the width of each of the light leading-out structures 150 in the first direction D1 may be equal to the width of each of the display pixels 210 in the first direction D1, but embodiments of the present disclosure are not limited thereto.

It should be noted that, for the other essential components of the display substrate 200 and the display device 10 (for example, a thin film transistor control device, an image data encoding/decoding device, a row scanning driver, a column scanning driver, a clock circuit, etc.), applicable conventional components can be adopted, which should be understood by those of ordinary skill in the art, is not described in detail herein, and should not be taken as a limitation of the present disclosure.

The embodiments of the present disclosure provide a light source module and a display device. The light source module can realize the collimated emission of light, and can reduce the viewing angle of the display device including the light source module.

What are described above is related to the specific embodiments of the present disclosure only, and is not intended to limit the scope of protection of the present disclosure. The protection scope of the present disclosure should be subject to the protection scope defined by the claims.

What is claimed is:

1. A light source module, comprising an optical waveguide structure, a first light source, and a pre-collimating optical element,
wherein the optical waveguide structure comprises a light introduction part and a main body part which are provided in parallel in a first direction, the light introduction part comprises a light incident surface, and the main body part comprises a light emitting surface;
the first light source is opposite to the light introduction part in the first direction, and is configured to provide first light; and
the pre-collimating optical element is provided between the first light source and the light introduction part in the first direction, and is configured to collimate at least a portion of the first light to be first collimated light, and the pre-collimating optical element is on a side of the light introduction part away from the main body part, wherein the light introduction part is configured to introduce at least a portion of the first collimated light, which is incident from the light incident surface, into the main body part at a first angle with respect to the light emitting surface to satisfy a total reflection condition of the main body part.

2. The light source module according to claim 1,
wherein the light introduction part comprises a first inclined reflecting surface;
an included angle between the first inclined reflecting surface and the light incident surface is an acute angle; and
the first inclined reflecting surface is configured to reflect at least the portion of the first collimated light that is incident from the light incident surface.

3. The light source module according to claim 2,
wherein a shape of an orthographic projection of the light introduction part on a first projection plane that is perpendicular to both the light incident surface and the light emitting surface is a right-angle trapezoid.

4. A light source module, comprising an optical waveguide structure, a first light source, and a pre-collimating optical element,
wherein the optical waveguide structure comprises a light introduction part and a main body part which are provided in parallel in a first direction, the light introduction part comprises a light incident surface, and the main body part comprises a light emitting surface;
the first light source is opposite to the light introduction part in the first direction, and is configured to provide first light;
the pre-collimating optical element is provided between the first light source and the light introduction part in the first direction, and is configured to collimate at least a portion of the first light to be first collimated light;
the light introduction part is configured to introduce at least a portion of the first collimated light, which is incident from the light incident surface, into the main body part at a first angle with respect to the light emitting surface to satisfy a total reflection condition of the main body part;
the light introduction part comprises a first inclined reflecting surface, an included angle between the first inclined reflecting surface and the light incident surface is an acute angle, and the first inclined reflecting surface is configured to reflect at least the portion of the first collimated light that is incident from the light incident surface; and
the light source module further comprises
a base substrate configured to support the optical waveguide structure,
the base substrate is provided at a side of the first inclined reflecting surface away from the first light source, and a part, corresponding to the main body part, of the base substrate is provided at a side of the main body part opposite to the light emitting surface.

5. The light source module according to claim 4,
wherein the base substrate comprises a second inclined reflecting surface and a supporting surface; and
the second inclined reflecting surface is parallel to the first inclined reflecting surface, and the supporting surface is parallel to the light emitting surface.

6. The light source module according to claim 5,
wherein a refractive index of the light introduction part is greater than a refractive index of the base substrate, and the first inclined reflecting surface and the second inclined reflecting surface are in direct contact to form a total reflection interface.

7. The light source module according to claim 5, further comprising a reflective film,
wherein the reflective film is provided on the first inclined reflecting surface and/or the second inclined reflecting surface, and is configured to reflect the first collimated light incident on the reflective film.

8. The light source module according to claim 1, further comprising an inclined reflecting structure,
wherein the light introduction part comprises an optical grating substrate and a coupling optical grating on a light incident surface of the optical grating substrate;
an included angle between the inclined reflecting structure and the light incident surface of the optical grating substrate is an acute angle;
the coupling optical grating is provided between the pre-collimating optical element and the main body part in the first direction, and is configured to receive the first collimated light reflected by the inclined reflecting structure; and
the coupling optical grating is further configured to introduce the first collimated light satisfying a predetermined incident angle into the main body part.

9. The light source module according to claim 2, further comprising at least one light leading-out structure,
wherein the at least one light leading-out structure is provided on the light emitting surface, and is configured to introduce at least the portion of the first collimated light transmitted in the optical waveguide structure out of the light source module at a same angle.

10. The light source module according to claim 9,
wherein the at least one light leading-out structure comprises a plurality of optical grating strips spaced apart in the first direction.

11. The light source module according to claim 9, further comprising a plurality of light leading-out structures arranged in an array.

12. A light source module, comprising an optical waveguide structure, a first light source, and a pre-collimating optical element,
wherein the optical waveguide structure comprises a light introduction part and a main body part which are provided in parallel in a first direction, the light introduction part comprises a light incident surface, and the main body part comprises a light emitting surface;

the first light source is opposite to the light introduction part in the first direction, and is configured to provide first light;

the pre-collimating optical element is provided between the first light source and the light introduction part in the first direction, and is configured to collimate at least a portion of the first light to be first collimated light;

the light introduction part is configured to introduce at least a portion of the first collimated light, which is incident from the light incident surface, into the main body part at a first angle with respect to the light emitting surface to satisfy a total reflection condition of the main body part;

the light source module further comprises a second light source and a third light source, wherein the second light source and the third light source are both opposite to the light incident surface, and are respectively configured to provide second light and third light; and the pre-collimating optical element is further configured to collimate at least a portion of the second light to be second collimated light and to collimate at least a portion of the third light to be third collimated light, respectively.

13. The light source module according to claim 12, wherein a pitch between the first light source and the pre-collimating optical element in the first direction, a pitch between the second light source and the pre-collimating optical element in the first direction, and a pitch between the third light source and the pre-collimating optical element in the first direction are all equal to a focal length of the pre-collimating optical element.

14. The light source module according to claim 12, wherein the pre-collimating optical element is further configured to allow the first collimated light, the second collimated light, and the third collimated light to be incident into the light introduction part at mutually different angles with respect to the light emitting surface; and the light introduction part is further configured to introduce at least the portion of the second collimated light into the main body part at a second angle with respect to the light emitting surface and to introduce at least the portion of the third collimated light into the main body part at a third angle with respect to the light emitting surface, respectively.

15. The light source module according to claim 12, further comprising at least one light leading-out structure, wherein the at least one light leading-out structure is further configured to allow the first collimated light, the second collimated light, and the third collimated light to leave the light source module at an angle perpendicular to the light emitting surface.

16. The light source module according to claim 10, wherein a wavelength λ1 of the first light, a distance a1 between the first light source and a second projection plane, a pitch P of the plurality of optical grating strips in the first direction, and a included angle β between the first inclined reflecting surface and a plane parallel to the light emitting surface satisfy a following relationship:

$$n2\times\sin(\gamma1') = n\times\sin[\pi/2 - \arctan(a1/F) - 2\beta] - m\times\lambda1/P;$$

F is a focal length of the pre-collimating optical element, P is a period of the plurality of optical grating strips in the at least one light leading-out structure, m is an integer, γ1' is an angle at which the first collimated light leaves the light source module, n is a refractive index of the main body part, and n2 is a refractive index of a medium into which the first collimated light enters after leaving the light source module; and the second projection plane is parallel to the light emitting surface, and a main optical axis of the pre-collimating optical element is in the second projection plane.

17. The light source module according to claim 10, further comprising a second light source and a third light source, wherein the second light source and the third light source are respectively configured to provide second light and third light; a wavelength λ2 of the second light, a wavelength λ3 of the third light, a distance a2 between the second light source and the second projection plane, a distance a3 between the third light source and the second projection plane, a pitch P of the plurality of optical grating strips in the first direction, and an included angle β between the first inclined reflecting surface and a plane parallel to the light emitting surface satisfy following relationships:

$$n2\times\sin(\gamma2') = n\times\sin[\pi/2 - \arctan(a2/F) - 2\beta] - m\times\lambda2/P,$$
and
$$n2\times\sin(\gamma3') = n\times\sin[\pi/2 - \arctan(a3/F) - 2\beta] - m\times\lambda3/P;$$

γ2' is an angle at which the second collimated light leaves the light source module, and γ3' is an angle at which the third collimated light leaves the light source module.

18. The light source module according to claim 17, wherein the wavelength λ1 of the first light, the wavelength λ2 of the second light, the wavelength λ3 of the third light, the distance a1 between the first light source and the second projection plane, the distance a2 between the second light source and the second projection plane, and the distance a3 between the third light source and the second projection plane satisfy following relationships: λ1<λ2<λ3, and a1>a2>a3.

19. An electronic device, comprising the light source module according to claim 1.

20. The electronic device according claim 19, further comprising: a display substrate, wherein the display substrate comprises display pixels arranged in an array;

the light source module comprises light leading-out structures arranged in an array; and the light leading-out structures correspond to the display pixels one by one.

* * * * *